US012559135B2

(12) United States Patent
Ohsugi

(10) Patent No.: US 12,559,135 B2
(45) Date of Patent: Feb. 24, 2026

(54) AUTONOMOUS DRIVING SYSTEM

(71) Applicant: TOYOTA JIDOSHA KABUSHIKI KAISHA, Toyota (JP)

(72) Inventor: Masamichi Ohsugi, Sunto-gun Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 18/675,878

(22) Filed: May 28, 2024

(65) Prior Publication Data

US 2024/0409121 A1     Dec. 12, 2024

(30) Foreign Application Priority Data

Jun. 7, 2023     (JP) ................................. 2023-094039

(51) Int. Cl.
*B60W 60/00*          (2020.01)
*B60W 50/02*          (2012.01)

(52) U.S. Cl.
CPC ...... *B60W 60/001* (2020.02); *B60W 50/0205* (2013.01); *B60W 2050/0215* (2013.01); *B60W 2556/45* (2020.02)

(58) Field of Classification Search
None
See application file for complete search history.

(56) References Cited

U.S. PATENT DOCUMENTS

| | | | | |
|---|---|---|---|---|
| 9,221,396 B1 * | 12/2015 | Zhu | ......................... | B60Q 9/008 |
| 9,274,525 B1 * | 3/2016 | Ferguson | .............. | B60W 10/18 |
| 9,940,761 B2 * | 4/2018 | Kundu | ................. | G05D 1/0055 |
| 11,241,721 B2 * | 2/2022 | Violetta | .................... | B60S 1/56 |
| 11,248,925 B2 * | 2/2022 | Lee | ......................... | G06V 20/20 |
| 11,531,339 B2 * | 12/2022 | Bielby | ................. | G05B 23/024 |
| 11,586,943 B2 * | 2/2023 | Kale | ..................... | G06F 3/0679 |
| 11,704,945 B2 * | 7/2023 | Krishnamurthy | .. | G05B 23/0283 |
| | | | | 701/31.4 |
| 11,775,816 B2 * | 10/2023 | Bielby | .................. | G06N 3/063 |
| | | | | 706/21 |
| 11,878,670 B2 * | 1/2024 | Takaki | ................ | B60R 21/0134 |
| 12,134,410 B2 * | 11/2024 | Gottbehüt | ......... | B60W 60/0053 |
| 12,179,794 B2 * | 12/2024 | Batts | ...................... | B60Q 5/005 |
| 12,246,734 B1 * | 3/2025 | Jung | ................ | B60W 50/0205 |
| 2015/0112570 A1 * | 4/2015 | Schmudderich | ....... | G06V 20/58 |
| | | | | 701/1 |

(Continued)

FOREIGN PATENT DOCUMENTS

| | | |
|---|---|---|
| DE | 102016014549 A1 | 7/2017 |
| JP | 2017-194948 A | 10/2017 |

(Continued)

*Primary Examiner* — Jonathan M Dager
(74) *Attorney, Agent, or Firm* — Dinsmore & Shohl LLP

(57)          ABSTRACT

A autonomous driving system detects information related to at least one of driving conditions and surrounding conditions of a vehicle using one or more sensors, implements vehicle control using a machine learning model based on the information, presents the detection results of the sensor when a detection performance of the sensor is lower than a predetermined level, and presents the detection results of the sensor corresponding to a situation when a situation with a risk higher than a specified value occurs in the vehicle.

8 Claims, 3 Drawing Sheets

(56)          References Cited

U.S. PATENT DOCUMENTS

| | | | | |
|---|---|---|---|---|
| 2015/0353088 | A1* | 12/2015 | Ishikawa | B60W 50/082 |
| | | | | 701/23 |
| 2016/0009294 | A1* | 1/2016 | Gunaratne | B60W 50/12 |
| | | | | 701/36 |
| 2017/0009294 | A1 | 1/2017 | Müller et al. | |
| 2018/0040171 | A1* | 2/2018 | Kundu | G05D 1/0055 |
| 2019/0061775 | A1* | 2/2019 | Emura | G01S 7/497 |
| 2019/0176797 | A1 | 6/2019 | Okubo et al. | |
| 2019/0236862 | A1* | 8/2019 | Mercep | G08G 1/165 |
| 2019/0258878 | A1* | 8/2019 | Koivisto | G05D 1/00 |
| 2019/0382031 | A1* | 12/2019 | Hu | B60W 60/00186 |
| 2020/0039528 | A1* | 2/2020 | Ewert | G07C 5/008 |
| 2020/0209848 | A1* | 7/2020 | Mercep | G05D 1/0088 |
| 2020/0302233 | A1 | 9/2020 | Iwasaki | |
| 2021/0124344 | A1* | 4/2021 | Hu | G05B 23/0283 |
| 2021/0163021 | A1* | 6/2021 | Frazzoli | B60W 50/023 |
| 2021/0171077 | A1* | 6/2021 | Green | B61L 15/0063 |
| 2021/0312725 | A1* | 10/2021 | Milton | G06N 3/098 |
| 2021/0383133 | A1* | 12/2021 | Wang | G01S 15/931 |
| 2022/0274526 | A1 | 9/2022 | Yamashita | |
| 2022/0327818 | A1 | 10/2022 | Sato et al. | |
| 2022/0388545 | A1 | 12/2022 | Chae et al. | |
| 2022/0392229 | A1* | 12/2022 | Dharia | G06V 10/98 |
| 2022/0410916 | A1* | 12/2022 | Cordeiro | B60R 11/04 |
| 2023/0033951 | A1* | 2/2023 | Karagiannis | G06F 1/1626 |
| 2023/0388481 | A1* | 11/2023 | Yin | G06T 7/60 |
| 2024/0239358 | A1* | 7/2024 | She | B60W 50/0205 |
| 2024/0278805 | A1* | 8/2024 | Shetiya | B60W 30/09 |
| 2024/0353545 | A1* | 10/2024 | Sun | B60W 60/001 |

FOREIGN PATENT DOCUMENTS

| | | | |
|---|---|---|---|
| WO | 2018/037815 | A1 | 3/2018 |
| WO | 2019/116423 | A1 | 6/2019 |
| WO | 2021/006287 | A1 | 1/2021 |
| WO | 2021/065559 | A1 | 4/2021 |

* cited by examiner

AUTONOMOUS DRIVING SYSTEM

CROSS-REFERENCE TO RELATED APPLICATION

This application is based on Japanese Patent Application No. 2023-094039 filed with Japan Patent Office on Jun. 7, 2023, the entire contents of which are hereby incorporated by reference.

TECHNICAL FIELD

The present disclosure relates to an autonomous driving system.

BACKGROUND

Autonomous driving systems that perform vehicle automation using machine learning models for vehicle control are known. As an example of this type of technology, International Publication No. 2019/116423 describes a teaching data collection device for collecting teaching data that can be used for machine learning to generate an autonomous driving model.

SUMMARY

However, machine learning models generated by machine learning do not necessarily have the capability to realize appropriate vehicle control in all situations. The range in which vehicle control using machine learning models can be appropriately executed may change depending on traffic environments such as weather, time of day, and traffic volume. Therefore, to appropriately operate vehicle control by machine learning models, it is desirable to effectively monitor such vehicle control. Accordingly, this disclosure describes an autonomous driving system capable of effectively monitoring vehicle control by machine learning models.

An embodiment of the autonomous driving system disclosed herein detects information related to at least one of the vehicle's driving conditions and surrounding conditions using one or more sensors, implements vehicle control using a machine learning model based on the information, and presents detection results of the sensor when the sensor's detection performance is below a predetermined level, and when a situation with a risk higher than a specified value occurs in the vehicle, it presents the detection results of the sensor corresponding to that situation.

An embodiment of the autonomous driving system disclosed herein a case where the detection performance of the sensor is lower than the predetermined level may include at least one of the following: when the sensor fails to detect a surrounding object or a lane marking, when a stability of the sensor is lower than a past stability of the sensor, when the stability of the sensor is lower than a design value of the sensor, when the stability of the sensor is lower than a stability of an another sensor with an overlapping field of view for the sensor, and when the stability of the sensor is lower than a stability of another sensor of another vehicle that has traveled the same location.

According to various embodiments of the present disclosure, it is possible to provide an autonomous driving system capable of effectively monitoring vehicle control by machine learning models.

DETAILED DESCRIPTION

Figure 1:
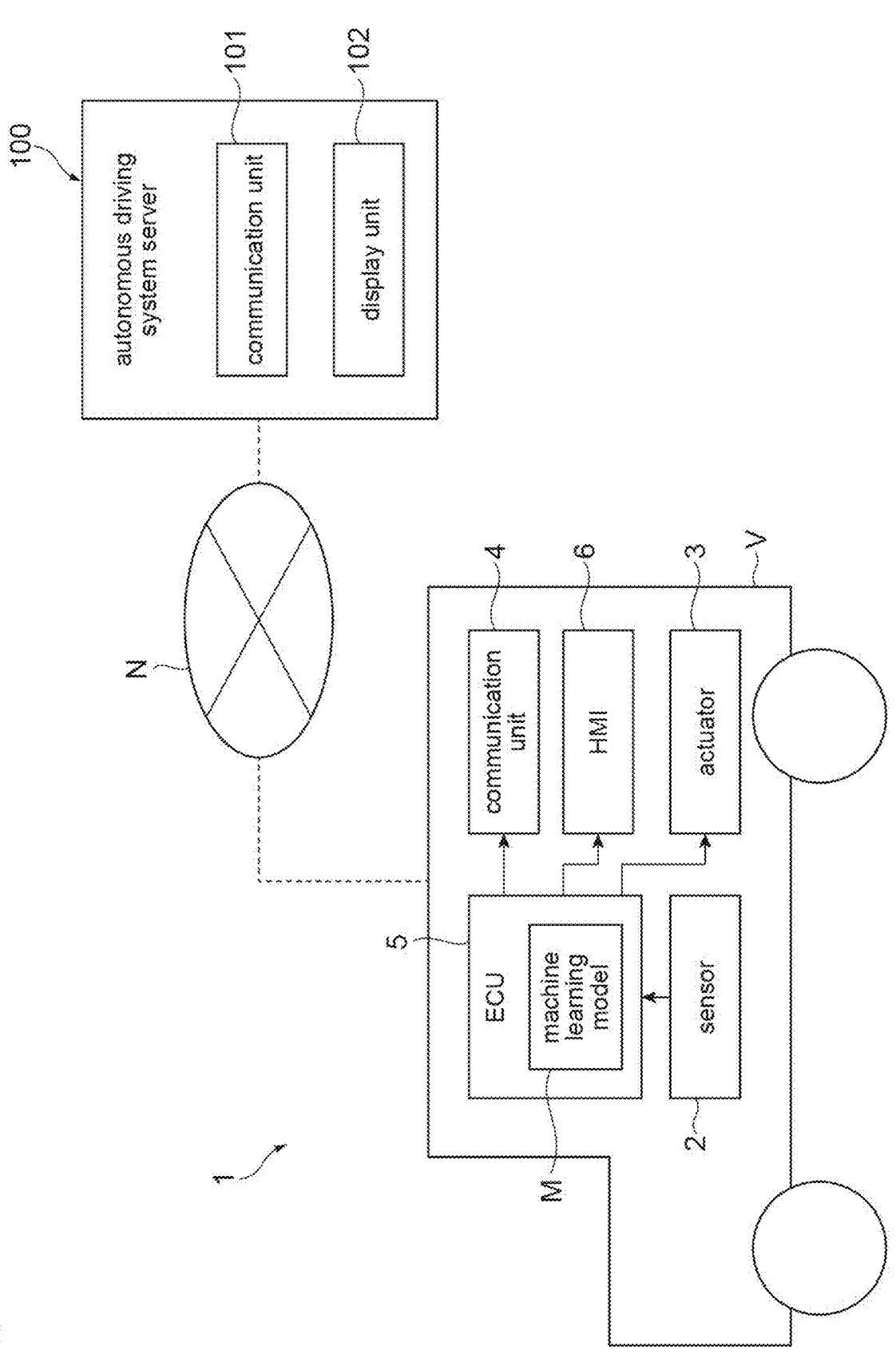
FIG. 1 is a block diagram showing the configuration of an autonomous driving system according to one embodiment.

Hereinafter, embodiments will be described in detail with reference to the accompanying drawings. In the description of the drawings, the same or equivalent elements are assigned the same reference numerals, and redundant descriptions are omitted.

As shown in FIG. 1, the autonomous driving system 1 according to the embodiment is a system that performs autonomous driving of a vehicle V by vehicle control using a machine learning model. The autonomous driving system 1 is mounted on the vehicle V. The vehicle V may be a passenger car or a freight vehicle. The vehicle V can accommodate one or more occupants. The vehicle V is an autonomous driving vehicle capable of autonomous driving [Autonomous Driving]. The vehicle V may also be capable of manual driving by the driver.

The autonomous driving system 1 includes a sensor 2, an actuator 3, a communication unit 4, an autonomous driving ECU 5 [Electronic Control Unit], and an HMI 6 [Human Machine Interface]. Sensor 2 is a sensor that detects information related to at least one of the vehicle V's driving conditions and surrounding conditions. Sensor 2 has external sensors and internal sensors. The external sensor is a sensor that acquires the surrounding environment of vehicle V. The external sensor may include at least one of a camera, millimeter-wave radar, and LIDAR [Light Detection and Ranging]. The internal sensor is a detection device that detects the driving state of vehicle V. The external sensor includes sensors that monitor the front, rear, and sides of vehicle V. The internal sensor includes at least one of a vehicle speed sensor, an acceleration sensor, and a yaw rate sensor. Sensor 2 transmits the detection results to the autonomous driving ECU 5.

Actuator 3 is a controller for controlling the speed of vehicle V. Actuator 3 may include, for example, an actuator that controls the output of an engine or motor, and a brake actuator. Communication unit 4 is a communication device that controls wireless communication with the outside of vehicle V. Communication unit 4, for example, communicates various information with an autonomous driving system server 100 via a communication network N. Communication unit 4 may also communicate various information with surrounding other vehicles. Communication unit 4 is not particularly limited and can use various known communication devices.

The autonomous driving ECU 5 is an electronic control unit that has a CPU [Central Processing Unit], ROM [Read Only Memory], RAM [Random Access Memory], etc. For example, the autonomous driving ECU 5 realizes various functions by loading a program recorded in the ROM into the RAM and executing the loaded program with the CPU. The autonomous driving ECU 5 may be composed of multiple electronic control units.

The autonomous driving ECU 5 executes vehicle control using the machine learning model M based on the detection results of sensor 2 (information related to at least one of the driving conditions and surrounding conditions of vehicle V). For example, the autonomous driving ECU 5 inputs the detection results of sensor 2 into the machine learning model M and outputs the control signals obtained thereby to actuator 3 to control the driving, braking, and steering of vehicle V to perform autonomous driving.

The machine learning model M is a recurrent type of deep learning model. The machine learning model M is a recurrent neural network [RNN]. The neural network may use a convolutional neural network [CNN] that includes multiple layers containing multiple convolutional layers and pooling layers, at least in part. In the machine learning model M, deep learning is performed by deep learning. The machine learning model M is a trained model that has been trained using data of vehicle V under predetermined learning conditions. For example, the machine learning model M may be trained using teaching data regarding the output to actuator 3 when various detection results of sensor 2 are input.

HMI 6 is an interface for inputting and outputting various information between the occupants (natural persons) of vehicle V. HMI 6, for example, includes a display and a speaker. HMI 6 performs image output on the display and sound output from the speaker according to control signals from ECU 10. HMI 6 may also include a HUD (Head Up Display). HMI 6 presents various information to the occupants of vehicle V.

The autonomous driving system server 100 is a server that can communicate with the autonomous driving system 1. The autonomous driving system server 100 includes a communication unit 101 and a display unit 102. Communication unit 101, for example, communicates various information with vehicle V via the communication network N. Communication unit 101 is not particularly limited and can use various known communication devices. Display unit 102 is an interface that presents various information to the user (natural person). Display unit 102 presents various information to the user through image output. Display unit 102 is not particularly limited and can use various known display devices.

In this embodiment, when the detection performance of sensor 2 is below the predetermined level, the autonomous driving ECU 5 presents the detection results of sensor 2 through HMI 6. When a situation with a risk higher than the specified value occurs in vehicle V, the autonomous driving ECU 5 presents the detection results of sensor 2 corresponding to that situation through HMI 6. The presentation of the detection results of sensor 2 may be performed by display unit 102 through communication units 4, 101, in addition to or instead of by HMI 6 (the same applies hereinafter). The sensor 2 corresponding to the situation with a risk higher than the specified value is, for example, a sensor that directly or indirectly detects the situation and related parameters.

When the detection performance of sensor 2 is below the predetermined level, it may be at least one of the following cases: when sensor 2 fails to detect a surrounding object or a lane marking, when the stability of sensor 2 is lower than its past stability, when the stability of sensor 2 is lower than the design value, when the stability of sensor 2 is lower than the stability of another sensor with an overlapping field of view, and when the stability of sensor 2 is lower than the stability of another sensor from another vehicle that has traveled the same location. Surrounding objects are not particularly limited and may include, for example, moving obstacles and fixed obstacles. The stability of sensor 2 means the general stability of the sensor, for example, the difficulty of fluctuation of detected values detected under certain conditions.

For example, when at least one of the acceleration and steering angular velocity of vehicle V is above the threshold value, the autonomous driving ECU 5 presents the detection results of the forward-looking sensor 2 as a situation with a risk higher than the specified value occurring in vehicle V. The threshold value may be preset and stored in the autonomous driving ECU 5, and may be a fixed value or a variable value. The risk is, for example, a risk related to the driving of vehicle V. The specified value is a value that has been preset. The risk and the specified value are not particularly limited and may be various known risks and specified values.

For example, when the driver intervenes and vehicle V changes lanes to the adjacent lane, when the distance between the driving trajectory of vehicle V before the lane change and another vehicle traveling in the adjacent lane is below the threshold value, the autonomous driving ECU 5 presents the detection results of the rear-looking sensor 2 and the side-looking sensor 2 as a situation with a risk higher than the specified value occurring in vehicle V. The threshold value may be preset and stored in the autonomous driving ECU 5, and may be a fixed value or a variable value.

When presenting the detection results of sensor 2, the autonomous driving ECU 5 may also present the detection results along with sample data. The sample data may be predetermined and stored in the autonomous driving ECU 5. The sample data is data that serves as a sample of the detection results of sensor 2, for example, data when sensor 2 is normal. This makes it easy to understand whether the detection results of sensor 2 are abnormal or normal.

When a situation with a risk higher than the specified value occurs in vehicle V, the autonomous driving ECU 5 may preferentially present the detection results of the second sensor 2, which has a higher degree of impact on the situation than the first sensor 2, through at least one of HMI 6 and display unit 102. This allows for the preferential understanding of the detection results of sensor 2 that more significantly affect the situation with a risk higher than the specified value.

Next, an example of a monitoring process for monitoring the detection results of sensor 2 by the autonomous driving system 1 of this embodiment will be described with reference to the flowcharts of FIGS. 2 and 3. The monitoring process here may be executed, for example, during the driving of vehicle V, and when the process reaches the end, the process may start again from the beginning after a predetermined time.

Figure 2:
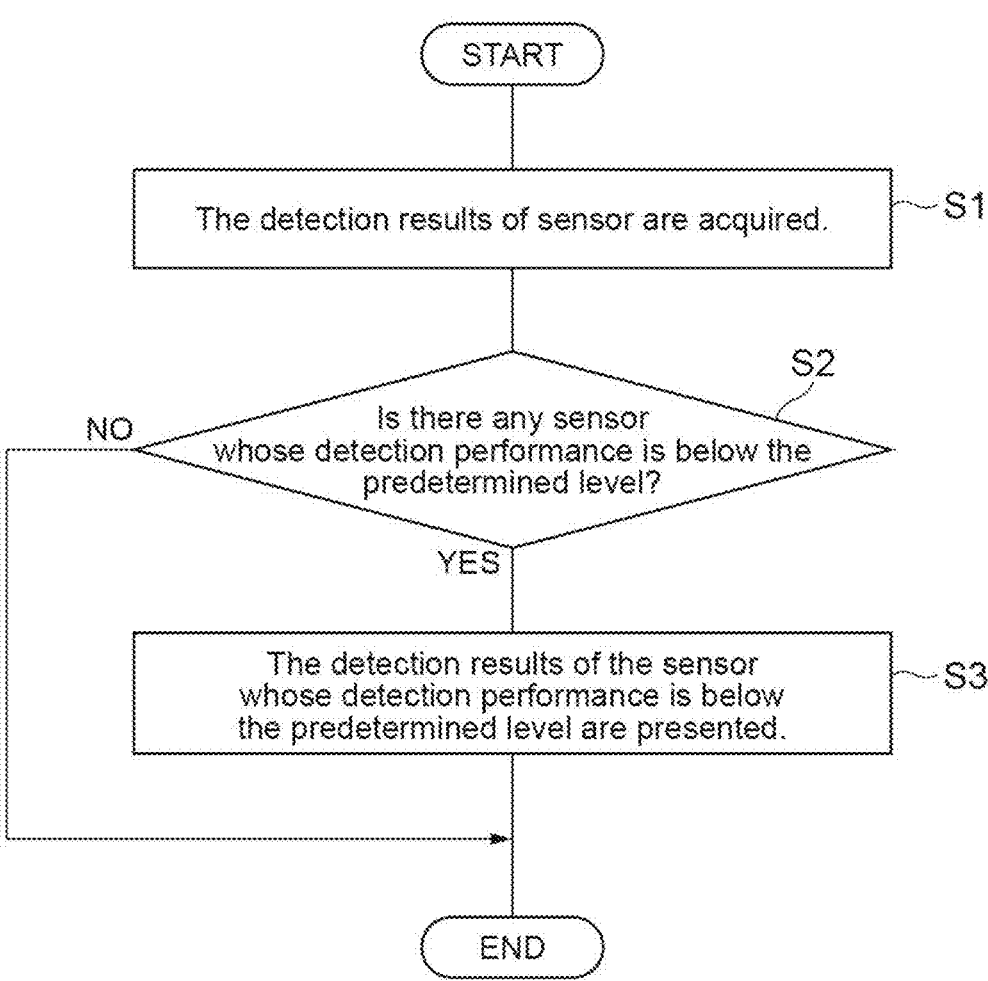
FIG. 2 is a flowchart showing an example of processing by the autonomous driving system of FIG. 1.

As shown in FIG. 2, the autonomous driving ECU 5 acquires the detection results of sensor 2 (Step S1). The autonomous driving ECU 5 determines whether there is any sensor 2 whose detection performance is below the predetermined level based on the detection results of sensor 2 (Step S2). For example, in the above Step S2, when a surrounding object or a lane marking is undetected in the detection results of sensor 2, when the current stability of sensor 2 is lower than its past stability, when the stability of sensor 2 is lower than the design value, when the stability of sensor 2 is lower than the stability of another sensor with an overlapping detection range, and when the stability of sensor 2 is lower than the stability of another sensor from another vehicle that has traveled the same location, it may be determined that there is a sensor 2 whose detection performance is below the predetermined level.

When the result is NO in the above Step S2, the process for this cycle is terminated, and the process moves to the next cycle of the above Step S1. On the other hand, when the result is YES in the above Step S2, the detection results of the sensor 2 whose detection performance is below the predetermined level are presented along with the sample data through HMI 6 (Step S3).

Figure 3:
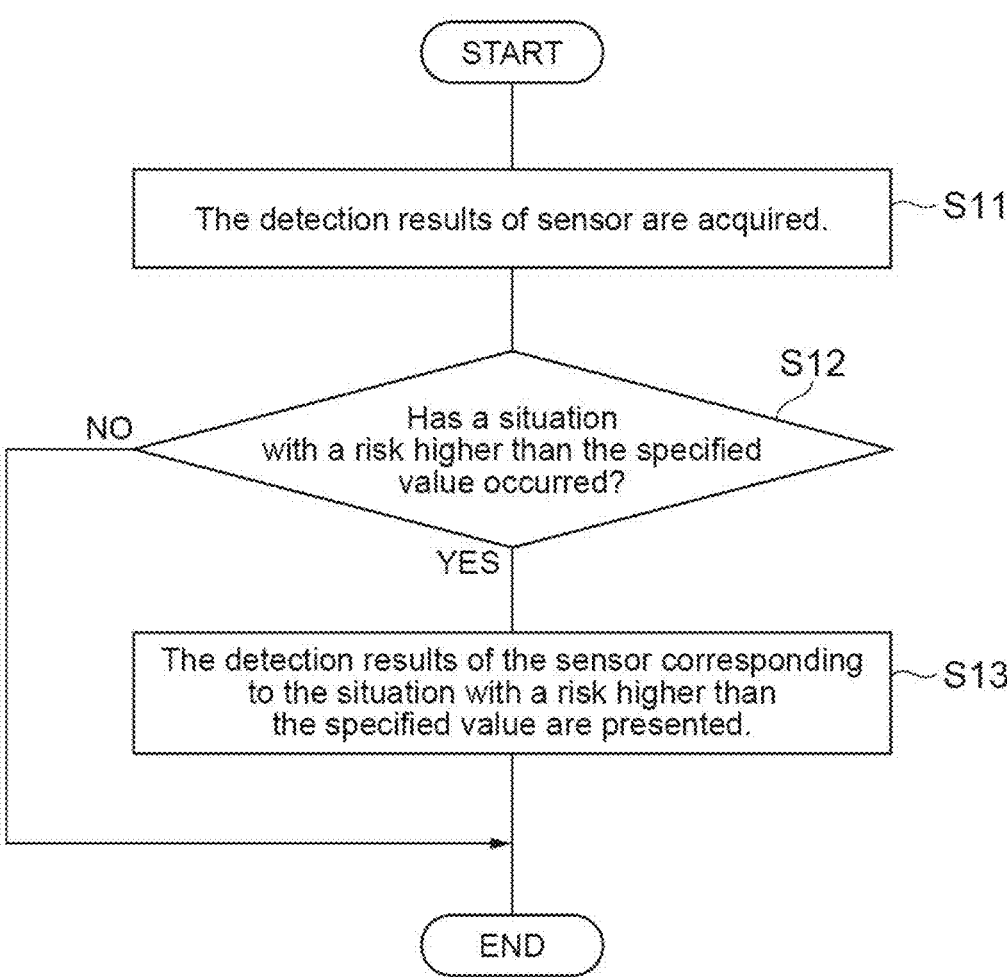
FIG. 3 is a flowchart showing another example of processing by the autonomous driving system of FIG. 1.

Also, as shown in FIG. 3, the autonomous driving ECU 5 acquires the detection results of sensor 2 (Step S11). The autonomous driving ECU 5 determines whether a situation with a risk higher than the specified value has occurred based on the detection results of sensor 2 (Step S12). For example, in the above Step S12, when at least one of the acceleration and steering angular velocity of vehicle V is above the threshold value, when vehicle V decelerates above the threshold value due to driver intervention, when a lane change is made due to driver intervention, or when the planning result of the driving route of vehicle V is temporally discontinuous, it may be determined that a situation with a risk higher than the specified value has occurred.

When the result is NO in the above Step S12, the process for this cycle is terminated, and the process moves to the next cycle of the above Step S11. On the other hand, when the result is YES in the above Step S12, the detection results of sensor 2 corresponding to the situation with a risk higher than the specified value are presented along with the sample data through HMI 6 (Step S13). In the above Step S13, when at least one of the acceleration and steering angular velocity of vehicle V is above the threshold value, the detection results of the forward sensor may be presented. In the above Step S13, when vehicle V decelerates above the threshold value due to driver intervention, the detection results of the forward sensor may be presented. In the above Step S13, when a lane change is made due to driver intervention, the detection results of the rear and side sensors may be presented. The presentation of the detection results may include the presentation of images of the road surface and the presentation of the position of vehicle V with respect to the recognized lane lines.

Note that in the above Steps S1 and S11, only one of them may be executed. When Step S1 is not executed, in the determination of the above Step S2, the detection results of sensor 2 acquired in the above Step S11 may be used. When Step S11 is not executed, in the determination of the above Step S12, the detection results of sensor 2 acquired in the above Step S1 may be used.

In the autonomous driving system 1, when vehicle V performs autonomous driving by vehicle control using the machine learning model M, by understanding the detection results of sensor 2 with low detection performance, for example, when the response of autonomous driving to the surrounding conditions of vehicle V is delayed, it is easy to understand whether the delay in response is due to sensor 2. In addition, when a situation with a risk higher than the specified value occurs, by understanding the detection results of sensor 2 that affect the situation, it is easy to understand whether the situation is due to sensor 2. In other words, according to the autonomous driving system 1, it is possible to effectively monitor vehicle control by the machine learning model M.

In the autonomous driving system 1, when the detection performance of sensor 2 is below the predetermined level, it may be at least one of the following cases: when sensor 2 fails to detect a surrounding object or a lane marking, when the stability of sensor 2 is lower than its past stability, when the stability of sensor 2 is lower than the design value, when the stability of sensor 2 is lower than the stability of another sensor with an overlapping field of view, and when the stability of sensor 2 is lower than the stability of another sensor from another vehicle that has traveled the same location. In this case, it is possible to specifically determine when the detection performance of the sensor is below the predetermined level.

In the autonomous driving system 1, when at least one of the acceleration and steering angular velocity of vehicle V is above the threshold value, the autonomous driving ECU 5 presents the detection results of the forward-looking sensor 2 as a situation with a risk higher than the specified value occurring in vehicle V. This allows for the easy understanding of the detection results of sensor 2 that affect the situation when at least one of the acceleration and steering angular velocity of vehicle V is above the threshold value.

In the autonomous driving system 1, when the driver intervenes and vehicle V changes lanes to the adjacent lane, when the distance between the driving trajectory of vehicle V before the lane change and another vehicle traveling in the adjacent lane is below the threshold value, the autonomous driving ECU 5 may present the detection results of the rear-looking sensor 2 and the side-looking sensor 2 as a situation with a risk higher than the specified value occurring in vehicle V. This allows for the easy understanding of the detection results of sensor 2 that affect the situation with a high possibility of contact with another vehicle during the lane change.

Although the embodiment has been described above, the embodiments of the present disclosure are not limited to the above embodiment. The embodiments of the present disclosure can be implemented in various forms by making various changes and improvements based on the knowledge of those skilled in the art, including the above embodiment.

In the above embodiment, the type of sensor 2 is not limited, and various detection devices may be included. Also, the number of sensors 2 mounted is not limited, and may be one or multiple. In the above embodiment, the case where the detection performance of sensor 2 is below the predetermined level is not particularly limited, and may be cases other than those described above. In the above embodiment, the situation with a risk higher than the specified value is not particularly limited, and may be situations other than those described above.

In the above embodiment, when the camera and LIDAR output separate detection results, the detection performance of the camera and LIDAR may be determined based on the detection results of each. On the other hand, when the camera and LIDAR output a single integrated detection result, it may be determined whether the detection performance of the camera and LIDAR is low based on the single detection result. In the above embodiment, when the reliability of a single integrated detection result of multiple sensors 2 is low, the detection results of the multiple sensors 2 may be presented as having low detection performance.

What is claimed is:

1. An autonomous driving system that detects information related to at least one of driving conditions and surrounding conditions of a vehicle, the autonomous driving system comprising:

one or more sensors that detects the information related to at least one of the driving conditions and the surrounding conditions of the vehicle; and an electronic control unit configured to:

implement vehicle control using a machine learning model based on at least one of the driving conditions and surrounding conditions, present the detection results of the sensor on a human machine interface when a detection performance of the sensor is lower than a predetermined level, present the detection results of the sensor corresponding to a situation on the human machine interface when a situation with a risk higher than a specified value occurs in the vehicle, and

present the detection results of a forward-looking sensor on the human machine interface when at least one of acceleration and steering angular velocity of the vehicle is above a threshold value, considering that the situation with the risk higher than the specified value has occurred in the vehicle.

2. The autonomous driving system according to claim 1, wherein a case where the detection performance of the sensor is lower than the predetermined level includes at least one of the following: when the sensor fails to detect a surrounding object or a lane marking, when a stability of the sensor is lower than a past stability of the sensor, when the stability of the sensor is lower than a design value of the sensor, when the stability of the sensor is lower than a stability of another sensor with an overlapping field of view for the sensor, and when the stability of the sensor is lower than a stability of another sensor of an another vehicle that has traveled the same location.

3. The autonomous driving system according to claim 1, wherein the electronic control unit is further configured to present the detection results of a rear-looking sensor and a side-looking sensor on the human machine interface when the vehicle changes lanes to an adjacent lane due to a driver's intervention, and a distance between a pre-lane-change trajectory of the vehicle and another vehicle traveling in the adjacent lane is below a threshold value, considering that the situation with the risk higher than the specified value has occurred in the vehicle.

4. The autonomous driving system according to claim 1, wherein the human machine interface includes a display.

5. The autonomous driving system according to claim 1, wherein the human machine interface includes a speaker.

6. An autonomous driving system that detects information related to at least one of driving conditions and surrounding conditions of a vehicle, the autonomous driving system comprising:

one or more sensors that detects the information related to at least one of the driving conditions and the surrounding conditions of the vehicle; and an electronic control unit configured to:

implement vehicle control using a machine learning model based on at least one of the driving conditions and surrounding conditions, present the detection results of the sensor on a human machine interface when a detection performance of the sensor is lower than a predetermined level, present the detection results of the sensor corresponding to a situation on the human machine interface when a situation with a risk higher than a specified value occurs in the vehicle, and present the detection results of a rear-looking sensor and a side-looking sensor on the human machine interface when the vehicle changes lanes to an adjacent lane due to a driver's intervention, and a distance between a pre-lane-change trajectory of the vehicle and another vehicle traveling in the adjacent lane is below a threshold value, considering that the situation with the risk higher than the specified value has occurred in the vehicle.

7. The autonomous driving system according to claim 6, wherein the human machine interface includes a display.

8. The autonomous driving system according to claim 6, wherein the human machine interface includes a speaker.

* * * * *